United States Patent [19]

Sasaki

[11] 3,967,592

[45] July 6, 1976

[54] ROTARY PISTON ENGINE EQUIPPED WITH AN IMPROVED AIR OR FUEL INJECTION OPENING

[75] Inventor: Yoshio Sasaki, Toyota, Japan

[73] Assignee: Toyota Jidosha Kogyo Kabushiki Kaisha, Toyota, Japan

[22] Filed: Nov. 5, 1974

[21] Appl. No.: 521,060

[30] Foreign Application Priority Data

July 22, 1974  Japan.............................. 49-83908

[52] U.S. Cl. .............................................. 123/8.09
[51] Int. Cl.² ............................................. F02B 53/10
[58] Field of Search.................. 123/8.09, 8.11, 8.13

[56] References Cited
UNITED STATES PATENTS

| 1,825,791 | 10/1931 | Haynes | 123/8.09 X |
| 2,126,795 | 8/1938 | McIntyre | 123/8.11 |
| 2,852,006 | 9/1958 | Mallinckrodt | 123/8.09 |
| 3,698,364 | 10/1972 | Jones | 123/8.09 |
| 3,699,929 | 10/1972 | Bennethum | 123/8.09 |
| 3,716,989 | 2/1973 | Moreira | 123/8.09 X |
| 3,783,839 | 1/1974 | Shimizu | 123/8.13 X |

FOREIGN PATENTS OR APPLICATIONS

| 1,451,729 | 7/1969 | Germany | 123/8.13 |
| 1,451,691 | 3/1970 | Germany | |

Primary Examiner—Carlton R. Croyle
Assistant Examiner—Edward Look
Attorney, Agent, or Firm—Stewart and Kolasch, Ltd.

[57] ABSTRACT

A rotary piston engine of the type having a trochoidal inner surface of a center housing and an eccentrically rotating polygonal rotor, wherein an air or fuel injection opening provided in a side housing wall is confined within a region limited so as to be outside of an outer envelope of traces of a side seal and inside an outer envelope of traces of a corner seal, said opening having a contour smaller than that of said corner seal.

5 Claims, 4 Drawing Figures

ROTARY PISTON ENGINE EQUIPPED WITH AN IMPROVED AIR OR FUEL INJECTION OPENING

BACKGROUND OF THE INVENTION

1. Field of the invention:

The present invention generally relates to a rotary piston engine and, more particularly, an improvement of a rotary piston engine of the type comprising a casing composed of a center housing having a trochoidal inner peripheral surface and side housings closing opposite ends of said center housing. A polygonal rotor adapted to rotate eccentrically in said casing with its apex seals provided at its apex edge portions contacts said inner peripheral surface of said center housing and with its corner seals provided at apex side portions and side seals provided to extend between two adjacent apex portions contacting inner walls of said side housings, so that volume variation of operating chambers defined by said casing and said rotor effects suction, compression, combustion, expansion and exhaustion strokes of operating fluid.

Conventionally, when an air or fuel injection opening is provided to open to an operating chamber space performing suction and compression strokes in a rotary piston engine of the aforementioned type so as to effect supercharging or direct fuel injection, there has been a problem in that if the opening is arranged to open to the inner peripheral surface of the center housing, through blowing of operating gases from one operating chamber to an adjacent operating chamber occurs by way of said opening at the moment said opening is traversed by the apex seal, causing lowered output of the engine and deterioration of fuel consumption rate. An alternative structure of providing said air or fuel injection opening at the wall of the side housing has not solved the blow-by gas problem since a similar through blowing of operating gases is generated by way of the opening when it is traversed by the corner or side seal, causing a droppage in the engine output power and deterioration in the fuel consumption rate.

SUMMARY OF THE INVENTION

Therefore, it is an object of the present invention to solve the aforementioned problem by providing an air or fuel injection opening of a relatively large cross sectional area without causing the through blowing of operating gases.

According to the present invention, the abovementioned object is accomplished in a rotary piston engine of the aforementioned type by providing an air or fuel injection opening which opens to said inner wall of said side housing within a region which defines said operating chamber during suction and compression strokes and is limited so as to be outside of an outer envelope of traces of said side seal and inside an outer envelope of traces of said corner seal, said opening having a contour smaller than that of said corner seal.

When an air or fuel injection opening satisfying the abovementioned conditions is provided, the formation of a flow passage which provides communication between adjacent operating chamber spaces or the formation of a flow passage which provide communication between one operating chamber and a central portion of the rotor, beyond the side seal, is avoided when the opening is traversed by the corner or side seal. Thus, the problems of engine output droppage, poor fuel consumption rate and blow-by gas increase due to the through blowing of operating gases are resolved.

According to a particular feature of the present invention, a plurality of openings may be provided for one operating chamber space, whereby any required opening area can be made available for air or fuel injection.

According to another feature of the present invention, said openings may be provided at the opposite inner walls of said side housing within the region which satisfies the aforementioned conditions. In this case, the openings may be arranged to oppose one another so that when the openings are employed for direct fuel injection or when air is ejected from an opening provided in one side inner wall and while fuel is ejected from another opening provided in the other side inner wall, the opposing fuel jets or the opposing fuel and air jets strike each other thereby achieving pulverization of the fuel and good mixing of fuel and the air. Alternatively, the openings provided at the opposite inner walls of the side housing may be arranged so as to be slightly displaced from each other so that jet flows ejected from opposing openings arranged in opposite walls only partially interfere with each other. In this case, the opposing jet flows which partially interfere with each other generate a vortex flow of air or fuel, thereby also accomplishing a good mixing of the fuel and the air.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

The present invention will now be described in more detail with respect to the preferred embodiment and with particular reference to the accompanying drawings.

Figure 1:
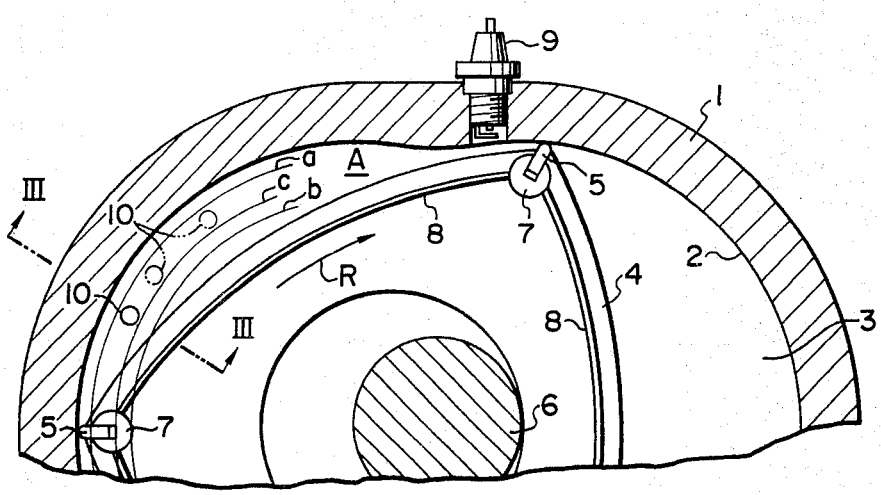
FIG. 1 is a cross sectional view of an essential portion of a rotary piston engine provided with an air or fuel injection opening according to the present invention, wherein, the rotor is shown in a side view to illustrate its side wall structure.
Figure 2:
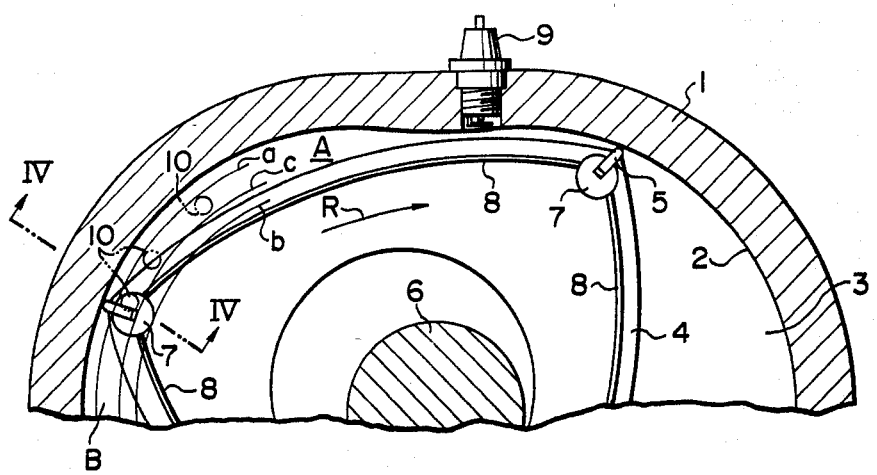
FIG. 2 is a view similar to FIG. 1, showing a condition in which the rotor has rotated a certain degree from the condition shown in FIG. 1.

Referring to FIGS. 1 and 2, element 1 designates a center housing having a trochoidal inner peripheral surface. The opposite ends of the center housing are closed by side housings 3 (only one of which is designated by reference numeral 3) to form a casing, in which a polygonal rotor 4 is mounted. The rotor rotates eccentrically around an eccentric shaft 6 with its apex seals 5 provided at its apex edge portions sliding over the inner peripheral surface 2 of the center housing. The rotor 4 also has corner seals 7 provided at apex side portions thereof and side seals 8 provided to extend between two adjacent apex portions along a side edge of the rotor, said corner and side seals contacting the inner wall of the side housing 3. 9 is a spark plug.

As the rotor 4 rotates eccentrically around the eccentric shaft 6 in the direction shown by the arrow R, the corner seal 7 slides over the inner surface of the side housing, drawing an outer envelope of traces as shown by curved line *a* and an inner envelope of traces as shown by curved line *b*. At the same time, the side seal 8 which slides over the inner surface of the side housing 3 draws an outer envelope of traces as shown by curved line *c*. Several air or fuel injection openings provided according to the present invention are designated by reference numerals 10. These openings are positioned within the region limited between the curved lines *a* and *c* and each having a contour smaller than the contour of the contacting surface of the corner seal 7.

Figure 3:
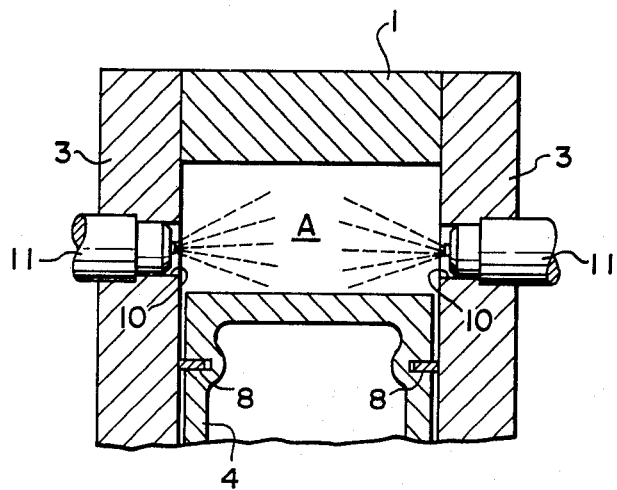
FIG. 3 is a sectional view taken along line III-III in FIG. 1 showing an embodiment wherein the opening is formed as a fuel injection opening equipped with a fuel injection nozzel; and, FIG. 4 is a view similar to FIG. 3 but shows another operating condition along line IV-IV in FIG. 2.
Figure 4:
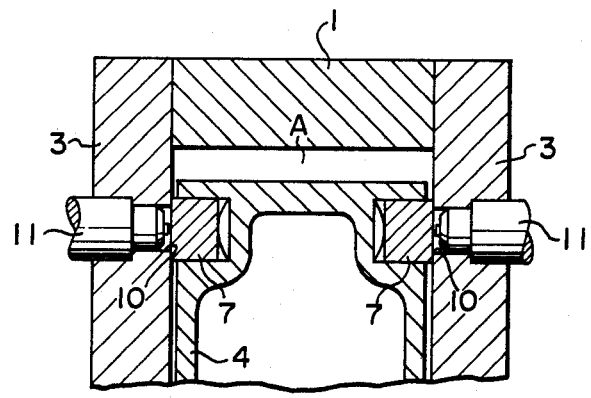

When the rotor 4 is in the position shown in FIG. 1, all of the openings 10 are open to an operating chamber space A. At this time, if the openings 10 are formed as fuel injection openings equipped with a fuel injection nozzle 11, fuel is injected into the operating chamber space A through the openings 10 as shown in FIG. 3. In FIG. 2, the rotor 4 is shown in a position slightly advanced from the position shown in FIG. 1 so that one of the openings 10 has been overlapped by the corner seal 7. The cross section along line IV—IV in this condition is shown in FIG. 4 corresponding to the embodiment shown in FIG. 3 incorporating the fuel injection nozzle 11 in the opening 10. As noted from FIG. 4, even when the opening 10 is overlapped by the corner seal 7, the opening does not simultaneously communicate with both of the operating chamber spaces A and B residing at opposite sides of the corner seal. Thus, a flow of fluid does not pass the opening 10 from one operating chamber space to the other.

Furthermore, since the openings 10 are positioned outside the envelope *c* of the traces of the side seals 8, they are never traversed by the side seals 8 and accordingly do not form a passage which communicates from the outside of the side seal 8 to the inside thereof. The air or fuel injection openings 10 may be provided in any number required along the region limited between the curved lines *a* and *c* as shown in FIGS. 1 and 2, and these openings may be provided at the opposite walls of the side housings, as opposing one another, or displaced slightly from a strictly opposing relationship, as already mentioned. From the foregoing, it will be appreciated that, according to the present invention, it is possible to provide air or fuel injection openings for the purpose of super-charging or direct fuel injection at optional rotating position and in any required opening area without causing the problem of engine power droppage, deterioration of fuel consumption rate and increase of the blow-by gas amount.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. In a rotary piston engine comprising a casing composed of a center housing having a trochoidal inner peripheral surface and side housings closing opposite ends of said center housing, and a polygonal rotor rotatably disposed for eccentric rotation in said casing, said rotor being provided with apex seals disposed at the apex edge portions thereof and contacting said inner peripheral surface of said center housing with corner seals provided at the apex side portions thereof and with side seals provided to extend between two adjacent apex portions of the rotor and contacting the inner walls of said side housings so that the volume variation of the operating chambers defined by said casing and said rotor effect suction, compression, combustion, expansion and exhaustion strokes of the operating fluid, wherein the improvement comprises providing at least one injection opening which opens in said inner wall at a portion which defines said operating chambers while they are performing suction and compression strokes, said opening being disposed outside the outer envelope of traces of said side seal and inside the outer envelope of traces of said corner seal, said opening having a cross-sectional shape which is covered by the cross-sectional shape of said corner seal.

2. The rotary piston engine of claim 1, wherein said opening is provided in plurality to simultaneously serve one operating chamber.

3. A rotary piston engine according to claim 1, wherein said openings are provided at opposite inner walls of said side housings.

4. A rotary piston engine according to claim 3, wherein said openings are arranged to oppose one another.

5. A rotary piston engine according to claim 3, wherein said openings are arranged to be slightly displaced from strictly opposing positions so that jet flows ejected from the openings disposed in the opposite walls partially interfere with each other.

* * * * *